United States Patent Office 3,477,733
Patented Nov. 11, 1969

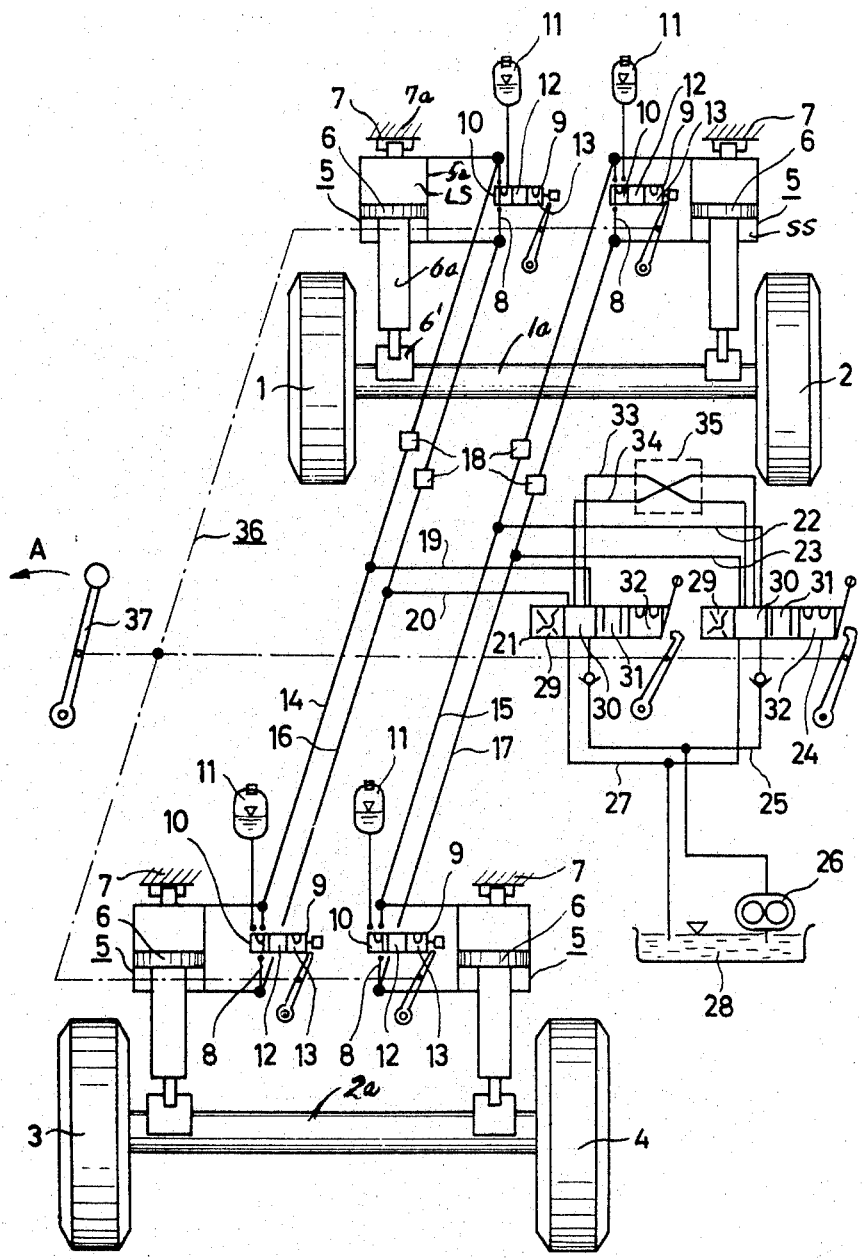

3,477,733
WHEEL SUSPENSION FOR VEHICLES
Heinrich Georg Gottschalk, Bullach 32, near Nuremberg, Germany, assignor to Karl Heinz Schmidt, Vorra, Kreis Hersbruck, Germany
Continuation-in-part of application Ser. No. 417,150, Dec. 9, 1964. This application May 5, 1967, Ser. No. 636,532
Claims priority, application Germany, May 13, 1966, Sch 38,988
Int. Cl. B62d 37/00; B60g 21/06
U.S. Cl. 280—6                             3 Claims

ABSTRACT OF THE DISCLOSURE

A wheel suspension for vehicles in which a suspension element for each wheel includes a cylinder-piston unit operably related to the frame and axle. A conduit leads between the larger cylinder space and the smaller cylinder space with first and second branch conduit means groupwise interconnecting the larger and smaller cylinder spaces respectively of at least some of the suspension elements with each other. The larger and smaller cylinder spaces are respectively connected to a pressure fluid source and pressure supply container via the branch conduit means and an additional conduit means including valve means connects the larger cylinder spaces with a pneumatic pressure chamber.

---

This application is a continuation-in-part of my copending application Ser. No. 417,150 filed Dec. 9, 1964 now patent No. 3,356,954 and entitled "Reel Suspension System For Road Vehicles And Cross-Country Vehicles."

Additional valve means are provided for the branch conduit means interconnecting the larger cylinder spaces and the conduit between the larger and smaller cylinder spaces of each element. A multi-way valve control unit is operably related to the branch conduit means and a common adjusting drive is capable of being connected to the valve means for the conduit between the larger and smaller cylinder spaces and the multi-way control unit for actuating the valve means to a closed position and the control unit to connect the first and second branch conduit means.

The present invention relates to hydraulic and hydraulically pneumatic suspension arrangements for wheels for highway or road vehicles and off the road vehicles or cross-country cars and in which the suspension arrangement includes a plurality of suspension elements.

In my earlier application, each of the suspension elements is constituted by a cylinder closed at both ends, a piston movable therein and a rod for the piston. The cylinder is connected with the vehicle chassis, whereas the piston is connected with the corresponding wheel axle. The larger cylinder space opposite the piston rod in each of the cylinders is connected to the opposite smaller cylinder space of the cylinders surrounding the piston rod. Furthermore, branch conduit means group-wise interconnect the larger cylinder spaces of at least some of the suspension elements with each other and at least some of the suspension elements also being connected to a pressure fluid source and a fluid container and cut-off valve means arranged in the branch conduit means. There is also disclosed in the above referred to application the concept of the smaller cylinder spaces of at least some of the suspension elements being group-wise connected with each other by branch conduit means and also being connectable with a pressure fluid source and a fluid container. Cut-off valve means are provided for the conduit means interconnecting the larger cylinder spaces with the smaller cylinder spaces of the same suspension elements.

In a further embodiment of my earlier application, the respective larger cylinder spaces of the suspension elements are connected by conduit means which can be cutoff with at least one pneumatic pressure supply chamber.

Wheel suspension arrangements of the character briefly outlined above are particularly efficacious for use with cross-country vehicles, special vehicles for transporting heavy and bulky loads and for vehicles carrying cranes and kindred equipment.

However, for certain types of vehicles, a wheel suspension arrangement is desirable which will possess still better stabilizing characteristics of spring suspension as compared to those shown and described in the earlier application.

Accordingly, a salient object of this invention is an improvement and further development of the wheel suspension system disclosed in the earlier application and functions for solving the problem of improving the stabilizing properties of the wheel suspension components.

Hence, this invention is predicated on a wheel suspension arrangement for vehicles of the type referred to in the above mentioned application and in which a multiple of suspensions elements, the nature of which elements carry at least one wheel and is defined by a cylinder closed at both ends, a piston movable therein and a rod for the piston with the cylinder being connected to the vehicle chassis and the piston connected to the corresponding wheel axle, the larger cylinder space opposite the piston rod in each of the cylinders being connected by conduit means having a cut-off means with the opposite smaller cylinder space of the cylinders surrounding the piston rods, the larger cylinder spaces of at least several of the suspension elements being connected with each other group-wise via branch conduit means and the respective smaller cylinder spaces of at least several suspension elements being connected with each other group-wise by other branch conduit means and said branch conduit means being connectable to a source of pressure and a supply chamber of pressure and furthermore, in which the larger cylinder spaces are connected by conduit means which can be cut-off with a pneumatic pressure supply chamber with cut-off means being disposed at least in the branch conduit means connecting the larger cylinder spaces.

The problems above referred to are solved by the present invention, in that the cut-off means for the conduit means connecting the larger cylinder spaces with the smaller cylinder spaces are movable simultaneously into the cut-off position by a common adjusting means and coupled with such common adjusting means is a multiway control unit by means of which after the cut-off position has been accomplished, there can be simultaneously connected the branch conduit means connecting the larger cylinder spaces of a group of suspension elements to the branch conduit means connecting the smaller cylinder spaces of another group of suspension elements and the branch conduit means connecting the smaller cylinder spaces of the first noted group of suspension elements to the branch conduit means connecting the larger cylinder chamber spaces of the other group of suspension elements.

Further objects and advantages of the invention will become more readily apparent to persons skilled in the art from the following detailed specification and annexed drawing and in which drawing the single figure is a diagrammatic view of a hydraulic pneumatic wheel suspension arrangement embodying the present invention.

It will be noted from the drawing that respective pairs of vehicle wheels 1, 2 and 3, 4 respectively are connected to each other by means of rigid axles 1a and 2a respectively. A pair of suspension elements denoted generally 5 is operably related with each of the axles 1a and 2a. More specifically, each suspension element 5 includes a cylinder 5a, a piston 6 and a piston rod 6a. Each cylinder is operably connected to a vehicle frame or chassis 7 as denoted at 7a and each piston rod 6a is operably connected to the axles 1a and 2a as indicated at 6'. Manifestly, it is possible for the piston rod to be in engagement with the vehicle chassis and the cylinder 5a with the wheel axle.

The larger space between the head of the piston and the base of the cylinder is denoted LS whereas the smaller space is denoted SS and the respective spaces can be connected by means of a conduit 8 and located in the conduit 8 is a multi-way valve 9 having three positions. In the first position denoted 10, the conduit 8 provides communication between the smaller space SS and the larger space LS, as well as with a pneumatic pressure supply container 11 within which a gas cushion under pressure acts upon the fluid level of the pressure fluid for the wheel suspension system. In the second position indicated 12, the spaces SS and LS are not in communication with each other, as well as with the container 11, while in the third position, only the larger space LS is connected with the container 11, since the connection to the smaller cylinder space SS is blocked. The purpose of the above mentioned positions will be later described in more detail.

The larger cylinder spaces LS associated with the wheels 1 and 3 and 2 and 4 respectively, which are situated on one side of the vehicle are connected into one group by means of branch conduits 14 and 15 respectively and in a like fashion, the smaller cylinder spaces SS of each group of suspension elements are connected by branch conduits 16 and 17 respectively. Cut-off means 18 are provided for each of the branch conduits 14–17. The conduits 14 and 16 which serve for connecting the suspension elements of the wheels 1 and 3 are connected to a multi-way valve means 21 by conduits 19 and 20 respectively, whereas the branch conduits 15 and 17 which connect the elements related with the wheels 2 and 4 are connected to a second multi-way valve means 24 by means of conduits 22 and 23. In addition, supply pipes 25 equipped with check valves communicate with the two multi-way valves 21 and 24 and the supply pipes are connected to a pressure pump 26. Conduits 27 communicate with the valves 21 and 24 and discharge into a pressure supply chamber 28.

The two multi-way valves 21 and 24 each have four selectively adjustable positions. In the first of these positions as indicated at 29, the pressure pump 26 is in communication with the branch conduits 16, 17 connecting respectively the smaller cylinder spaces of the group of suspension elements, whereas the pressure supply chamber 28 is connected with the branch conduits 14, 15 which connect the respective larger cylinder spaces of the same group of suspension elements. In the position denoted 30, the branch conduit connecting the larger cylinder spaces LS of a group of suspension elements and the branch conduit connecting the smaller cylinder spaces SS of the same group of elements are not in communication with each other, as well as with the pressure pump 26 and the supply chamber 28.

In the third position illustrated at 31, the pump 26 in contrast to the position illustrated in 29 is connected with the branch conduits 14, 15 which connect the larger cylinder spaces of a group of suspension elements, whereas the pressure supply chamber 28 is connected to the branch conduit 16, 17 which provide communication between the smaller cylinder spaces SS of this group of suspension elements.

In the fourth position of the valves 21 and 22 indicated at 32, the conduits 25 and 26 respectively which lead from the pump 26 and the pressure supply chamber 28 to the multi-way valves are cut-off or blocked, whereas the branch conduits 14 and 16 and 15 and 17 respectively are connected with a pair of conduits 33, 34 which is cross-connected as indicated at 35. Hence, if the valve position 32 is adjusted simultaneously in both valves 21 and 24, this corresponds to a connection of the branch conduit 14 with the branch conduit 17 and a connection of the branch conduit 16 in with the branch conduit 15.

An adjusting drive mechanism 36 provided with an actuating lever 37 is included in the arrangement and by means of which the multi-way valves 9 can be simultaneously moved to their third position 13, regardless of the position in which the valves were at that particular moment and in addition to which the valves 21 and 24 are at the same time, moved into their fourth position 32, regardless of the position of the valves at the moment.

The suspension arrangement operates as follows:

As was the case in my earlier patent application, it is possible by adjustment of the position indicated at 12 for the valves 9 associated with a particular group of suspension elements to cut-out or inactivate, so to speak, the spring effect of this group of elements made possible by the supply chambers or containers 11, so that a wheel pressure equalization occurs, such as for example, between wheels 1 and 3 or 2 and 4, between the elements of the group via the conduits 14, 15 which connect the larger cylinder spaces as well as conduit 16, 17 which connect the smaller cylinder spaces. The valves 21 and 24 assume the position indicated at 30 and if the valve means 18 in the branch conduits are moved to the cut-off position, then the elements associated with one group of wheels or even all of the suspension elements become rigid connecting components between the axles and the vehicle frame or chassis.

If, the valves 9 are in the cut-off position shown at 12, then by setting the positions on the valve 21 and 24, as indicated at 29 or 31 the respective distance between the axle and the vehicle chassis can be changed as desired, either by pumping pressure means into the larger cylinder space of certain suspension elements and relieving pressure from the smaller cylinder spaces or vice versa. However, it should be mentioned, that during travel, the valves 21 and 24 are generally in the position indicated at 30.

If the adjusting drive mechanism is actuated by movement of the lever 37 in the direction of the arrow A then the valves 9 are moved to the position indicated at 13 and the valves 21 and 24 to the position indicated at 32. This means that the branch conduit connecting the larger cylinder spaces of a group of elements is linked up with the branch conduit connecting the smaller cylinder spaces of another group of elements and that the branch conduit providing communication between the smaller cylinder spaces of the first noted group of elements is linked with the branch conduit connecting the larger cylinder spaces of the other group of suspension elements. By virtue thereof, there is attained a particularly good stabilization of the spring action of the vehicle during travel.

It is also to be understood that the suspension elements related with a wheel axle can also be combined into a group so that a spring equalization effect can be accomplished between two respective wheel axles by connecting the two branch conduits of each respective group of elements cross-wise with one another and for which purpose use may be made of a multi-way valve arrangement similar in structural detail to the valves 21 and 24.

In the event the valves 18 are cut-off, then by means of the cross-jointing of the connections between the conduits 14 and 15, as well as 16 and 17 by the valves 21 and 24, it is possible to realize a spring stabilization which is effective exclusively between the wheels 3 and 4. With the assistance of a further set of cut-out valves in the respective branch conduits, the same stabilizing effect can be selectively accomplished for the wheels 1 and 2.

This invention is not to be confined to any strict conformity to the showings in the drawings but changes or modifications may be made therein so long as such changes

I claim:

1. A wheel suspension arrangement for vehicles having a frame, at least two front and two rear wheels, axles for the wheels and a plurality of suspension elements, each of said suspension elements being operably related to one wheel, each suspension element including a cylinder, a piston movable in the cylinder and a piston rod for the piston projecting beyond the cylinder, means connecting the projecting end of the piston rod to the respective wheel axle and the closed end of the cylinder to the frame, said piston normally dividing the cylinder into spaces of different volumes, conduit means leading between the larger cylinder space and the smaller cylinder space, a pneumatic pressure chamber, said conduit means including valve means connecting said larger cylinder spaces with said pneumatic pressure chamber, said valve means including means providing three valve positions, one of said valve positions providing communication between the larger and smaller cylinder spaces of a particular suspension element and with said pneumatic pressure chamber, the second of said positions preventing communication between the larger and smaller cylinder spaces of the particular suspension element and the pneumatic pressure chamber and the third position providing communication between the larger cylinder space of said suspension element and the pneumatic pressure chamber but with the pneumatic pressure chamber being out of communication with the smaller cylinder space, branch conduit means group-wise interconnecting the larger cylinder spaces of at least some of said suspension elements with each other, further branch conduit means group-wise interconnecting the smaller cylinder spaces of at least some of said suspension elements with each other, a pressure fluid source, a pressure supply container, said larger cylinder spaces and smaller cylinder spaces being respectively connected to said pressure fluid source and pressure supply container via said branch and further branch conduit means, valve means for at least said branch conduit means connecting the larger cylinder spaces of at least two suspension elements with each other, a multi-way valve control unit operably related to said branch conduit means and said further branch conduit means, a common adjusting drive to operate said valve means between the larger cylinder space and said pneumatic pressure chamber and also to operate said multi-way valve control unit and for actuating said valve means to the closed position and simultaneously actuating said multi-way valve control unit to connect said branch conduit means and further branch conduit means.

2. The wheel suspension arrangement for vehicles as claimed in claim 1 in which said multi-way valve control unit includes two multi-way valves each associated with one group of suspension elements and each having four positions, the first position connecting said branch conduit means with the pressure supply reservoir and the further branch conduit means with said pressure fluid source, the second position preventing communication between said branch conduit means and further branch conduit means and from the pressure fluid source and pressure supply reservoir, the third position connecting said branch conduit means connecting the larger cylinder spaces of a group of elements with the pressure fluid source and said further branch conduit means connecting the smaller cylinder spaces of such group with the pressure supply reservoir and the fourth position operable by the common adjusting drive connects the branch conduit means connecting the larger cylinder spaces of a group of elements and the further branch conduit means connecting the smaller cylinder spaces of a group with a cross-jointed conduit means connecting the two multi-way valves.

3. The wheel suspension arrangement as claimed in claim 1 in which the suspension elements associated with the front and rear wheels on one side of the vehicle are combined into one group.

References Cited
UNITED STATES PATENTS

| | | | |
|---|---|---|---|
| 3,356,954 | 12/1967 | Gottschalk | 280—6 |
| 3,191,954 | 6/1965 | Schnetz | 280—6 |
| 3,068,023 | 12/1962 | Fiala | 280—124 |
| 2,869,892 | 1/1959 | Sahagian | 280—124 |

PHILIP GOODMAN, Primary Examiner

U.S. Cl. X.R.

280—124